(12) United States Patent
Liu

(10) Patent No.: US 12,556,903 B2
(45) Date of Patent: Feb. 17, 2026

(54) METHOD AND APPARATUS FOR NOTIFYING SECONDARY CELL GROUP STATUS INFORMATION AND NETWORK-SIDE DEVICE

(71) Applicant: VIVO MOBILE COMMUNICATION CO., LTD., Guangdong (CN)

(72) Inventor: Xuanbing Liu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 327 days.

(21) Appl. No.: 18/335,753

(22) Filed: Jun. 15, 2023

(65) Prior Publication Data

US 2023/0328504 A1 Oct. 12, 2023

Related U.S. Application Data

(63) Continuation of application No. PCT/CN2021/140293, filed on Dec. 22, 2021.

(30) Foreign Application Priority Data

Dec. 25, 2020 (CN) .......................... 202011567318.X

(51) Int. Cl.
*H04W 8/14* (2009.01)
(52) U.S. Cl.
CPC ..................... *H04W 8/14* (2013.01)
(58) Field of Classification Search
CPC ........................................ H04W 8/14
USPC ....................................... 455/422.1
See application file for complete search history.

(56) References Cited

U.S. PATENT DOCUMENTS

| | | | | |
|---|---|---|---|---|
| 2020/0169922 A1* | 5/2020 | Ozturk | .................. | H04W 88/06 |
| 2021/0227623 A1* | 7/2021 | Park | ..................... | H04W 88/08 |
| 2022/0015007 A1* | 1/2022 | Han | ........................ | H04W 8/14 |
| 2023/0188973 A1* | 6/2023 | Visa | ........................ | H04L 69/24 |
| | | | | 455/422.1 |
| 2023/0199568 A1* | 6/2023 | Vesely | .................. | H04W 28/24 |
| | | | | 455/422.1 |

FOREIGN PATENT DOCUMENTS

| | | |
|---|---|---|
| CN | 110417520 A | 11/2019 |
| WO | 2019225900 A1 | 11/2019 |

OTHER PUBLICATIONS

International Search Report and Written Opinion for Application No. PCT /CN2021/140293, dated Mar. 1, 2022, 7 Pages.

(Continued)

*Primary Examiner* — Qutbuddin Ghulamali
(74) *Attorney, Agent, or Firm* — Perilla Knox & Hildebrandt LLP; Kenneth A. Knox

(57) ABSTRACT

A method and an apparatus for notifying SCG status information and a network-side device, and pertains to the field of wireless communication are provided. The method for notifying SCG status information is applied to a secondary node. The method includes: transmitting SCG status information to a master node based on an SCG status, where the SCG status information includes first status information or second status information, the first status information is used to indicate that the SCG is to be suspended, and the second status information is used to indicate that the SCG is to be resumed.

14 Claims, 8 Drawing Sheets

(56) References Cited

OTHER PUBLICATIONS

Oppo "Discussion on SCG suspension or deactivation" 3GPP TSG-RAN WG2 Meeting #112 electronic, Online, Nov. 2020, R2-2008870, 10 Pages.
InterDigital "Inter-node signaling to support activation/deactivation of SCG" 3GPP RAN WG3 Meeting #110-e, Electronic, Nov. 2020, R3-205963, 4 Pages.
ZTE "Discussion on SCG deactivation and activation" 3GPP TSG-RAN WG3 #110-e, Online, Nov. 2020, R3-205990, 7 Pages.
Extended European Search Report for Application No. 21909432.3, dated May 22, 2024, 16 Pages.
Vivo "Efficient activation/deactivation mechanism for SCG and SCells" 3GPP TSG-RAN WG2 Meeting #111 electronic, E-Meeting, Aug. 2020, R2-2007215, 4 Pages.
ZTE Corporation, Sanechips "Further consideration on SCG deactivation and activation" 3GPP TSG-RAN WG2 Meeting #112 electronic, e-meeting, Nov. 2020, R2-2009246, 8 Pages.
Vivio "Activation and deactivation mechanism for SCG and SCells" 3GPP TSG-RAN WG2 Meeting #112 electronic Online, Nov. 2020, R2-2010290, 7 Pages.

* cited by examiner

200

S210

Transmit secondary cell group SCG state information to a master node based on a state of an SCG

METHOD AND APPARATUS FOR NOTIFYING SECONDARY CELL GROUP STATUS INFORMATION AND NETWORK-SIDE DEVICE

CROSS-REFERENCE TO RELATED APPLICATIONS

This is a continuation of International Application No. PCT/CN2021/140293 filed on Dec. 22, 2021, which claims priority to Chinese Patent Application No. 202011567318.X, filed on Dec. 25, 2020, which are incorporated herein by reference in their entireties.

TECHNICAL FIELD

This application pertains to the field of wireless communication technologies, and specifically, relates to a method and an apparatus for notifying secondary cell group status information and a network-side device.

BACKGROUND

In 5G new radio (NR), LTE and 5G systems may be tightly coupled in a dual connectivity (DC) manner. One of the systems is used as a master node (MN), and the other is used as a secondary node (SN). A dual-connectivity system includes two cell groups: a master cell group (MCG) and a secondary cell group (SCG). The master cell group may include one primary cell (PCell) and one or more secondary cells (SCell). The secondary cell group may include one primary secondary cell (PSCell) and one or more SCells.

A multi-SIM card terminal can camp on two networks at the same time, to be specific, establishing multiple radio access technology (RAT) dual connectivity (MR-DC) with the networks. In practical application, the multi-SIM card terminal may camp on the two networks in a time-division manner. For example, the multi-SIM card terminal camps on the network A and monitors paging of the network A for a time period, and camps on the network B and monitors paging of the network B for a time period. Alternatively, the multi-SIM card terminal is connected to the network A and receives and transmits data for a time period, and receives paging on the network B for a time period. Alternatively, the multi-SIM card terminal receives data on the network A for a time period, and establishes a connection or receives and transmits data on the network B for a time period.

In practical application, a terminal may suspend an SCG connection to perform other tasks. For example, a multi-SIM card terminal that supports MR-DC includes UE1 and UE2, and the UE1 may suspend an SCG connection to perform tasks of the UE2. However, in the current related art, in a case that an SCG status changes because UE suspends the SCG, there is no technical solution of how a master node or a secondary node knows the suspended status of the SCG, which may cause the master node and the secondary node to have inconsistent understandings of the SCG status.

SUMMARY

Embodiments of this application provide a method and an apparatus for notifying SCG status information and a network-side device.

According to a first aspect, a method for notifying secondary cell group status information is provided and applied to a secondary node. The method includes: transmitting SCG status information to a master node based on an SCG status, where the SCG status information includes first status information or second status information, the first status information is used to indicate that the SCG is to be suspended, and the second status information is used to indicate that the SCG is to be resumed.

According to a second aspect, a method for obtaining secondary cell group status information is provided and applied to a master node. The method includes: receiving SCG status information transmitted by a secondary node, where the SCG status information includes first status information or second status information, the first status information is used to indicate that an SCG is to be suspended, and the second status information is used to indicate that the SCG is to be resumed.

According to a third aspect, a method for notifying secondary cell group status information is provided and applied to a master node. The method includes: transmitting SCG status information to a secondary node based on an SCG status, where the SCG status information includes first status information or second status information, the first status information is used to indicate that the SCG is to be suspended, and the second status information is used to indicate that the SCG is to be resumed.

According to a fourth aspect, a method for obtaining secondary cell group status information is provided and applied to a secondary node. The method includes: receiving SCG status information transmitted by a master node, where the SCG status information includes first status information or second status information, the first status information is used to indicate that an SCG is to be suspended, and the second status information is used to indicate that the SCG is to be resumed.

According to a fifth aspect, an apparatus for notifying secondary cell group status information is provided and includes: a first obtaining module configured to obtain a secondary cell group SCG status; and a first transmitting module configured to transmit SCG status information to a master node based on the SCG status, where the SCG status information includes first status information or second status information, the first status information is used to indicate that the SCG is to be suspended, and the second status information is used to indicate that the SCG is to be resumed.

According to a sixth aspect, an apparatus for obtaining secondary cell group status information is provided and includes: a second receiving module configured to receive SCG status information transmitted by a secondary node, where the SCG status information includes first status information or second status information, the first status information is used to indicate that an SCG is to be suspended, and the second status information is used to indicate that the SCG is to be resumed; and a second obtaining module configured to obtain an SCG status based on the SCG status information.

According to a seventh aspect, an apparatus for notifying secondary cell group status information is provided and includes: a third obtaining module configured to obtain an SCG status; and a second transmitting module configured to transmit SCG status information to a secondary node based on the SCG status, where the SCG status information includes first status information or second status information, the first status information is used to indicate that the SCG is to be suspended, and the second status information is used to indicate that the SCG is to be resumed.

According to an eighth aspect, an apparatus for obtaining secondary cell group status information is provided and includes: a fourth receiving module configured to receive SCG status information transmitted by a master node, where the SCG status information includes first status information or second status information, the first status information is used to indicate that an SCG is to be suspended, and the second status information is used to indicate that the SCG is to be resumed; and a fourth obtaining module configured to obtain an SCG status based on the SCG status information.

According to a ninth aspect, a network-side device is provided, where the network-side device includes a processor, a memory, and a program or instructions stored in the memory and capable of running on the processor, where when the program or instructions are executed by the processor, the steps of the method according to the first aspect are implemented, or the steps of the method according to the second aspect are implemented, or the steps of the method according to the third aspect are implemented, or the steps of the method according to the fourth aspect are implemented.

According to a tenth aspect, a readable storage medium is provided, where the readable storage medium stores a program or instructions, and when the program or instructions are executed by a processor, the steps of the method according to the first aspect are implemented, or the steps of the method according to the second aspect are implemented, or the steps of the method according to the third aspect are implemented, or the steps of the method according to the fourth aspect are implemented.

According to an eleventh aspect, a chip is provided, where the chip includes a processor and a communication interface, the communication interface is coupled to the processor, and the processor is configured to run a program or instructions of a terminal to implement the steps of the method according to the first aspect, the steps of the method according to the second aspect, the steps of the method according to the third aspect, or the steps of the method according to the fourth aspect.

According to a twelfth aspect, a computer program product is provided, where the computer program product includes a processor, a memory, and a program or instructions stored in the memory and capable of running on the processor, and when the program or instructions are executed by the processor, the steps of the method according to the first aspect are implemented, or the steps of the method according to the second aspect are implemented, or the steps of the method according to the third aspect are implemented, or the steps of the method according to the fourth aspect are implemented.

DETAILED DESCRIPTION

The following clearly and describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first" and "second" are generally of a same type, and the quantities of the objects are not limited, for example, there may be one or more first objects. In addition, in this specification and claims, "and/or" indicates at least one of the connected objects, and the character "/" generally indicates an "or" relationship between the contextually associated objects.

It should be noted that the technologies described in the embodiments of this application are not limited to long term evolution (LTE)/LTE-advanced (LTE-A) systems, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for illustration purposes, NR terms are used in most of the following descriptions, and these technologies may also be applied to other applications than the NR system application, for example, the 6$^{th}$ generation (6G) communication system.

Figures 1, 2:
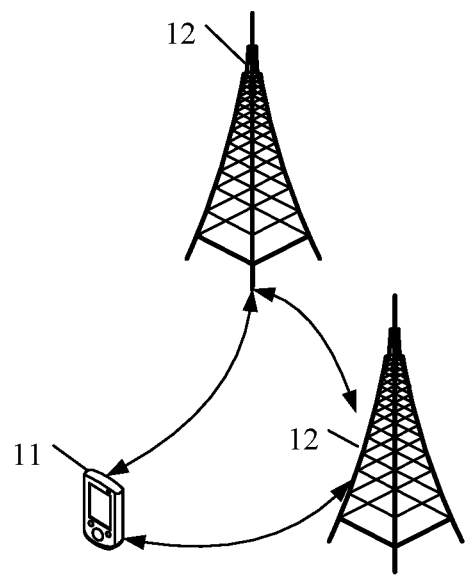
FIG. 1 is a schematic diagram of a wireless communication system to which embodiments of this application are applicable.
FIG. 2 is a schematic flowchart of a method for notifying SCG status information according to an embodiment of this application.

FIG. 1 is a schematic diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant, a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, or the like. It should be noted that the terminal 11 is not limited to any particular type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

The following describes in detail solutions for notifying and obtaining SCG status information provided in the embodiments of this application by using specific embodiments and application scenarios thereof with reference to the accompanying drawings.

FIG. 2 is a schematic flowchart of a method for notifying SCG status information according to an embodiment of this application. The method 200 may be performed by a secondary node. In other words, the method may be performed by software or hardware installed on the secondary node. As shown in FIG. 2, the method may include the following step.

S210. Transmit secondary cell group (SCG) status information to a master node based on an SCG status, where the SCG status information includes first status information or second status information, the first status information is used to indicate that the SCG is to be suspended, and the second status information is used to indicate that the SCG is to be resumed.

In this embodiment of this application, the secondary node may transmit the SCG status information to the master node based on the SCG status. For example, when the SCG is to be suspended, the first status information is transmitted to the master node; and when the SCG is to be resumed, the second status information is transmitted to the master node.

Figure 3:
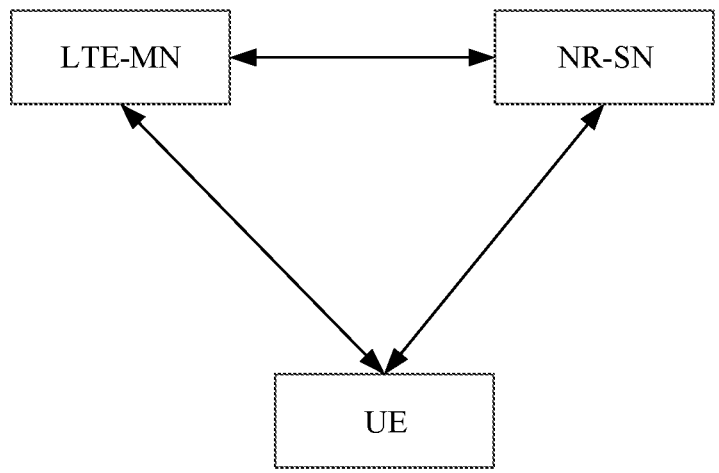
FIG. 3 is a schematic diagram of a dual-connectivity system according to an embodiment of this application.

In this embodiment of this application, the master node is a master node (MN) in two communication systems that are connected by UE in dual connectivity, and the secondary node is a secondary node (SN) in the two communication systems that are connected by the UE in dual connectivity. For example, in a dual-connectivity system shown in FIG. 3, an LTE system is used as a master node in dual connectivity, and an NR system is used as a secondary node in the dual connectivity.

In the technical solution provided in this embodiment of this application, the secondary node transmits the SCG status information to the master node based on the SCG status, such that both the master node and the secondary node can know the SCG status, avoiding the problem that the master node and the secondary node have inconsistent understandings of the SCG status in a case that the SCG status changes.

In practical application, the secondary node can perform step S210 in the case that the SCG status changes. For example, in a possible implementation, before S210, the method may further include: receiving SCG status request information from UE, where the SCG status request information is used to request to suspend the SCG, or the SCG status request information is used to request to resume the suspended SCG. For example, the UE may need to suspend an SCG connection to perform other tasks. Therefore, the UE transmits, to the secondary node, the SCG status request information for requesting to suspend the SCG so as to initiate an SCG suspend procedure. After receiving the SCG status request information, the secondary node transmits the SCG status information to the master node based on content requested in the request information. For example, in a case that the SCG status request information is used to request to suspend the SCG, the secondary node transmits the first status information to the master node; and in a case that the SCG status request information is used to request to resume the suspended SCG, the secondary node transmits the second status information to the master node. In this possible implementation, the secondary node may notify the master node of the SCG status in a case that the UE requests the secondary node to change the SCG status, so as to avoid that the master node has inconsistent understanding of the SCG status, reducing unnecessary signaling between network nodes.

In a possible implementation, the first status information includes but is not limited to at least one of the following (1) to (6).

(1) First indication information. The first indication information indicates that the SCG is suspended by a terminal-initiated SCG suspend procedure, and the suspension of the SCG needs to be lifted by the terminal. In other words, the first status information indicates that an SCG connection is suspended by a UE-initiated SCG suspend procedure. For the UE-suspended SCG, only after the UE lifts the suspension, the network can receive data from and transmit data to the UE in the SCG.

(2) Second indication information. The second indication information indicates that the terminal suspends an MR-DC capability. In other words, the first status information indicates that the UE suspends its MR-DC capability (UE SCG Capability Suspend). To be specific, in this possible implementation, the UE suspends the SCG connection by suspending its MR-DC capability.

(3) Third indication information. The third indication information indicates that the terminal disables an MR-DC capability. In other words, the first status information indicates that the UE disables an MR-DC capability (UE SCG Capability disabling). To be specific, in this possible implementation, the UE suspends the SCG connection by disabling its MR-DC capability.

(4) Fourth indication information. The fourth indication information indicates that the terminal suspends an MR-DC terminal resource. In other words, the first status information indicates that the UE suspends its MR-DC terminal resource (UE SCG Resource Suspend). To be specific, in this possible implementation, the UE suspends the SCG connection by suspending its MR-DC terminal resource.

(5) Fifth indication information. The fifth indication information indicates that the terminal disables an MR-DC terminal resource. In other words, the first status information indicates that the UE disables an MR-DC terminal resource (UE SCG Resource disabling). To be specific, in this possible implementation, the UE suspends the SCG connection by disabling its MR-DC terminal resource.

(6) Sixth indication information. The sixth indication information indicates that the SCG is suspended for a multi-SIM card (SCG Suspend by Multi-SIM). In other words, the first status information indicates that the SCG is suspended for a multi-SIM card.

Correspondingly, in a possible implementation, the second status information includes at least one of the following (1) to (7).

(1) Seventh indication information. The seventh indication information indicates that the SCG is resumed (SCG Resume).

(2) Eighth indication information. The eighth indication information indicates that a terminal-suspended SCG is resumed. In other words, the second status information indicates that a UE-suspended SCG is resumed (Resume the UE suspended SCG).

(3) Ninth indication information. The ninth indication information indicates that the terminal resumes an MR-DC capability (UE SCG Capability Resume). In other words, the second status information indicates that the UE resumes its MR-DC capability. For example, the UE can suspend its MR-DC capability when suspending the SCG, and resume its MR-DC capability when resuming the SCG.

(4) Tenth indication information. The tenth indication information indicates that the terminal enables an MR-DC capability (UE SCG Capability enabling). In other words, the second status information indicates that the UE enables its MR-DC capability. For example, the UE can disable its MR-DC capability when suspending the SCG, and enable its MR-DC capability when resuming the SCG.

(5) Eleventh indication information. The eleventh indication information indicates that the terminal resumes an MR-DC terminal resource (UE SCG Resource Resume). In other words, the second status information indicates that the UE resumes its MR-DC terminal resource. For example, the UE can suspend its MR-DC terminal resource when suspending the SCG, and resume its MR-DC terminal resource when resuming the SCG.

(6) Twelfth indication information. The twelfth indication information indicates that the terminal enables an MR-DC terminal resource (UE SCG Resource enabling). In other words, the second status information indicates that the UE enables its MR-DC terminal resource. For example, the UE can disable its MR-DC terminal resource when suspending the SCG, and enable its MR-DC terminal resource when resuming the SCG.

(7) Thirteenth indication information. The thirteenth indication information indicates that the SCG is resumed for a multi-SIM card (SCG Resume by Multi-SIM). In other words, the second status information indicates that the SCG is resumed for a multi-SIM card.

In a possible implementation, in S210, when the SCG status information is transmitted to the master node, the SCG status information may be added into a secondary node activity notification message for transmission. In the related art, in a dual-connectivity system, a secondary node can periodically notify a master node of user data activity or inactivity using an activity status of the secondary node, so that the master node determines whether to retain a resource corresponding to the secondary node. In this embodiment of this application, the secondary node activity notification message is used to notify the master node of the SCG status information, which can reduce transmission of the signaling.

Certainly, this is not limited thereto. In a specific application, the secondary node may alternatively add the SCG status information into another message including a status of the secondary node for transmission.

In practical application, optionally, the first status information and the second status information may be added into messages with a same name for transmission, and indicate different status of the SCG using different parameter values.

In the foregoing possible implementation, in a case that the SCG status information is the first status information, that is, the SCG status information indicates that the SCG is to be suspended, the secondary node activity notification message carrying the first status information can be transmitted once.

In the foregoing possible implementation, before the SCG is resumed, an activity status of the secondary node does not change. Therefore, to reduce signaling load between the network nodes, after transmitting the first status information to the master node, the secondary node can suspend transmission of the secondary node activity notification message.

Certainly, this is not limited thereto. The secondary node may alternatively transmit a plurality of secondary node activity notification messages to the master node, where each of the secondary node activity notification messages transmitted carries the first status information. Alternatively, the secondary node transmits the secondary node activity notification message carrying the first status information only once. However, before the SCG is resumed, the secondary node may also transmit a secondary node activity notification message carrying no first status information to the master node.

In the dual-connectivity system, there is a notification control indication procedure between the secondary node and the master node, and the master node may transmit a notification control indication message to the secondary node, or the secondary node may transmit a notification control indication message to the master node. The notification control indication message is used to indicate that a guaranteed flow bit rate (GFBR) of one or more QoS flows can be or cannot be satisfied.

When the SCG is suspended, content of the notification control indication message does not change before the SCG is resumed. Therefore, to reduce signaling overheads between the secondary node and the master node, in a possible implementation, after the first status information is transmitted to the master node, the method may further include: stopping transmission of a notification control indication message to the master node. In this possible implementation, signaling overheads between the secondary node and the master node can be reduced.

In the foregoing possible implementation, in a case that the transmission of the notification control indication message to the master node is stopped after the first status information indicating that the SCG is to be suspended is transmitted, after the second status information indicating that the SCG is to be resumed is transmitted, the method may further include: resuming transmission of the notification control indication message to the master node. In this way, the transmission of the notification control indication message can be resumed in a timely manner, ensuring the notification control indication procedure between the secondary node and the master node.

Figure 4:
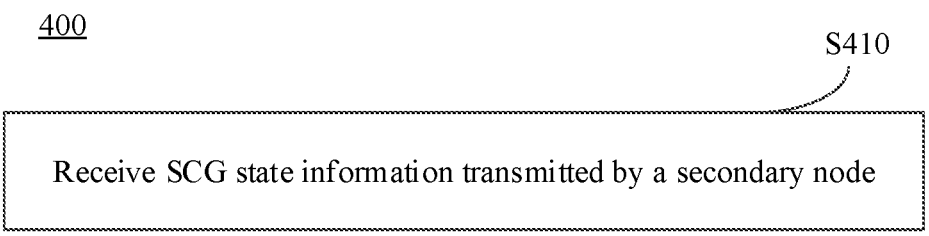
FIG. 4 is a schematic flowchart of a method for obtaining SCG status information according to an embodiment of this application.

FIG. 4 is a schematic flowchart of a method for obtaining SCG status information according to an embodiment of this application. The method 400 may be performed by a master node. In other words, the method may be performed by software or hardware installed on the master node. As shown in FIG. 4, the method may include the following step.

S410. Receive SCG status information transmitted by a secondary node, where the SCG status information includes first status information or second status information, the first status information is used to indicate that an SCG is to be suspended, and the second status information is used to indicate that the SCG is to be resumed.

Step S410 corresponds to S210 in the method 200, and the SCG status information is the same as the SCG status information in the method 200. For details, refer to the related descriptions in the method 200, which are not described herein again.

In this embodiment of this application, the secondary node may use the SCG status information transmitted in the implementations in the method 200. For details, refer to the related descriptions in the method 200, which are not described herein again.

In the method provided in this embodiment of this application, the master node can obtain an SCG status based on the SCG status information transmitted by the secondary node, thereby avoiding the problem that the master node and the secondary node have inconsistent understandings of the SCG status in a case that the SCG status changes.

In a possible implementation, after S410, the method may further include:

S412. Store the SCG status information; and/or

S414. Perform an SCG-related operation on a terminal based on the SCG status information.

In other words, in this possible implementation, after receiving the SCG status information, the master node may store the SCG status information so as to obtain the SCG status information when necessary.

In addition, the master node may or may not store the SCG status information, and performs the SCG-related operation on the terminal based on the SCG status information.

In a possible implementation, in a case that the SCG status information includes the first status information, the performing, by the master node, an SCG-related operation on a terminal includes but is not limited to at least one of operations in the following (1) to (5).

(1) Prohibiting transmission of data in the SCG. In other words, the master node no longer schedules the SCG to perform data transmission with the terminal, so as to avoid data loss.

(2) Stopping transmission of a notification control indication message to the secondary node. After the SCG is suspended, content of the notification control indication message does not change until the SCG is resumed. Therefore, to reduce signaling load between the network nodes, the master node can stop transmission of the notification control indication message to the secondary node.

(3) Determining whether to retain a resource corresponding to the secondary node. After the SCG is suspended, data transmission in the SCG is not required temporarily. Therefore, the master node can determine whether to retain the resource corresponding to the secondary node based on the current resource status.

(4) Notifying the secondary node to modify or release a connection of the SCG. Because the SCG is suspended, the master node can consider modifying the connection of the SCG or directly releasing the connection of the SCG. Therefore, the master node notifies the secondary node to modify or release the connection of the SCG.

(5) Reconfiguring the terminal to modify or release a connection of the SCG. The master node can reconfigure the terminal to modify or release the connection of the SCG.

In a case that the SCG status information includes the second status information, the performing, by the master node, an SCG-related operation on a terminal includes but is not limited to at least one of operations in the following (1) to (5).

(1) Resuming transmission of data in the SCG. Because the SCG is resumed, the master node can resume transmission of the data in the SCG.

(2) Resuming transmission of a notification control indication message to the secondary node. After the SCG is resumed, content of the notification control indication message may change. Therefore, the master node resumes transmitting the notification control indication message to the secondary node.

(3) Configuring a resource corresponding to the secondary node. In a case that the master node deletes the resource corresponding to the secondary node when the SCG is suspended, the master node can configure the resource corresponding to the secondary node when the SCG is resumed, so as to implement data transmission in the SCG.

(4) Requesting the secondary node to add or modify a connection of the SCG. In a case that the master node releases the connection of the SCG when the SCG is suspended, the master node can request the secondary node to add the connection of the SCG when the SCG is resumed, or in a case that the master node modifies the connection of the SCG when the SCG is suspended, the master node can notify the secondary node to modify the connection of the SCG when the SCG is resumed, so as to ensure data transmission in the SCG.

(5) Reconfiguring the terminal to establish or modify a connection of the SCG. When the SCG is resumed, the master node can reconfigure the terminal to modify or release the connection of the SCG, so as to ensure data transmission in the SCG.

Figure 5:
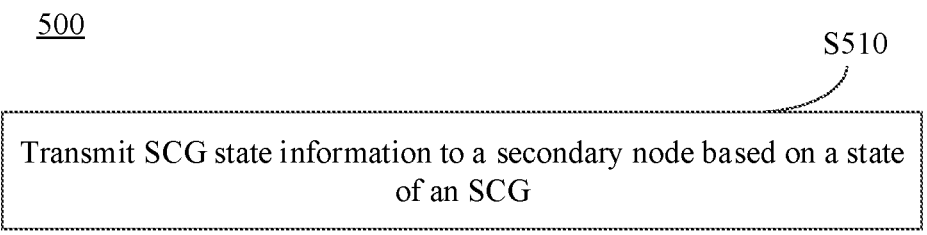
FIG. 5 is another schematic flowchart of a method for notifying SCG status information according to an embodiment of this application.

FIG. 5 is a schematic flowchart of a method for notifying SCG status information according to an embodiment of this application. The method 500 may be performed by a master node. In other words, the method may be performed by software or hardware installed on the master node. As shown in FIG. 5, the method may include the following step.

S510. Transmit SCG status information to a secondary node based on an SCG status, where the SCG status information includes first status information or second status information, the first status information is used to indicate that the SCG is to be suspended, and the second status information is used to indicate that the SCG is to be resumed.

The method 500 is similar to the method 200. The difference is that in the method 500, the master node transmits the SCG status information to the secondary node, but in the method 200, the secondary node transmits the SCG status information to the master node.

The SCG status information is the same as the SCG status information in the method 200. For details, refer to the related descriptions in the method 200, which are not described herein again.

In the method provided in this embodiment of this application, the master node can transmit the SCG status information to the secondary node based on the SCG status, thereby avoiding the problem that the master node and the secondary node have inconsistent understandings of the SCG status in a case that the SCG status changes.

In a possible implementation, similar to the method 200, before S510, the method may further include: receiving SCG status request information from a terminal, where the SCG status request information is used to request to suspend the SCG, or the SCG status request information is used to request to resume the suspended SCG. In other words, in this possible implementation, after receiving the SCG status request information from the terminal, the master node can determine that the SCG status has changed, and thus transmits the SCG status request information to the secondary node to notify the secondary node of the SCG status.

In a possible implementation, the first status information is further used to indicate that the secondary node suspends reporting of some or all of secondary node activity notification messages. In other words, after receiving the first status information, the secondary node can suspend transmission of the secondary node activity notification message until the SCG is resumed, or after receiving the first status information, the secondary node can stop transmission of some of the secondary node activity notification messages. For example, before the SCG is resumed, in a case the secondary node needs to transmit the secondary node activity notification message to the master node to notify the master node of some information, the secondary node can transmit the secondary node activity notification message to the master node.

In another possible implementation, the second status information is further used to indicate that the secondary node resumes reporting of a secondary node activity notification message. In other words, after receiving the second status information, the secondary node can resume transmission of the secondary node activity notification message, so that the master node can know an activity status of the secondary node in a timely manner.

In a possible implementation, in a case that the master node transmits a notification control indication message to the secondary node before the SCG is suspended, after the first status information is transmitted to the secondary node, the method further includes: stopping transmission of a notification control indication message to the secondary node. In this possible implementation, signaling load between the master node and the secondary node can be reduced.

In the foregoing possible implementation, optionally, after the second status information is transmitted to the secondary node, the method further includes: resuming transmission of the notification control indication message to the secondary node. In this possible implementation, the transmission of the notification control indication message can be resumed in a timely manner, so as to ensure a notification control indication procedure between the master node and the secondary node.

Figure 6:
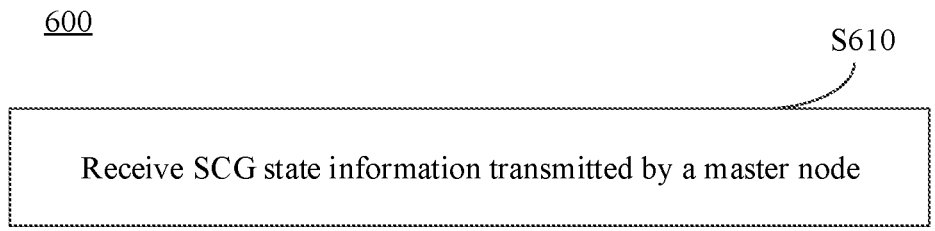
FIG. 6 is a schematic flowchart of a method for obtaining SCG status information according to an embodiment of this application.

FIG. 6 is a schematic flowchart of a method for obtaining SCG status information according to an embodiment of this application. The method 600 may be performed by a secondary node. In other words, the method may be performed by software or hardware installed on the secondary node. As shown in FIG. 6, the method may include the following step.

S610. Receive SCG status information transmitted by a master node, where the SCG status information includes first status information or second status information, the first status information is used to indicate that an SCG is to be suspended, and the second status information is used to indicate that the SCG is to be resumed.

The method 600 corresponds to the method 500, and the master node may transmit the SCG status information to the secondary node using the method in the method 500. For details, refer to the descriptions in the method 500.

The SCG status information is the same as the SCG status information in the method 200. For details, refer to the related descriptions in the method 200, which are not described herein again.

In a possible implementation, after the receiving SCG status information transmitted by a master node, the method further includes at least one of the following.

(1) Based on the SCG status information, suspending or resuming transmission of a notification control indication message to the master node. In a case that the SCG status information includes the first status information, the secondary node suspends transmission of the notification control indication message to the master node; and in a case that the SCG status information includes the second status information, the secondary node resumes transmitting the notification control indication message to the master node.

(2) Based on the SCG status information, suspending reporting of some or all of secondary node activity notification messages or resuming reporting of a secondary node activity notification message. In a case that the SCG status information includes the first status information, the secondary node suspends reporting of some or all of the secondary node activity notification messages; and in a case that the SCG status information includes the second status information, the secondary node resumes reporting of the secondary node activity notification message.

In the technical solution provided in this embodiment of this application, the secondary node can know an SCG status based on the SCG status information transmitted by the master node, so that the secondary node and the master node can synchronize the UE-initiated SCG suspended or resumed status, reducing signaling load between the network nodes.

Figure 7:
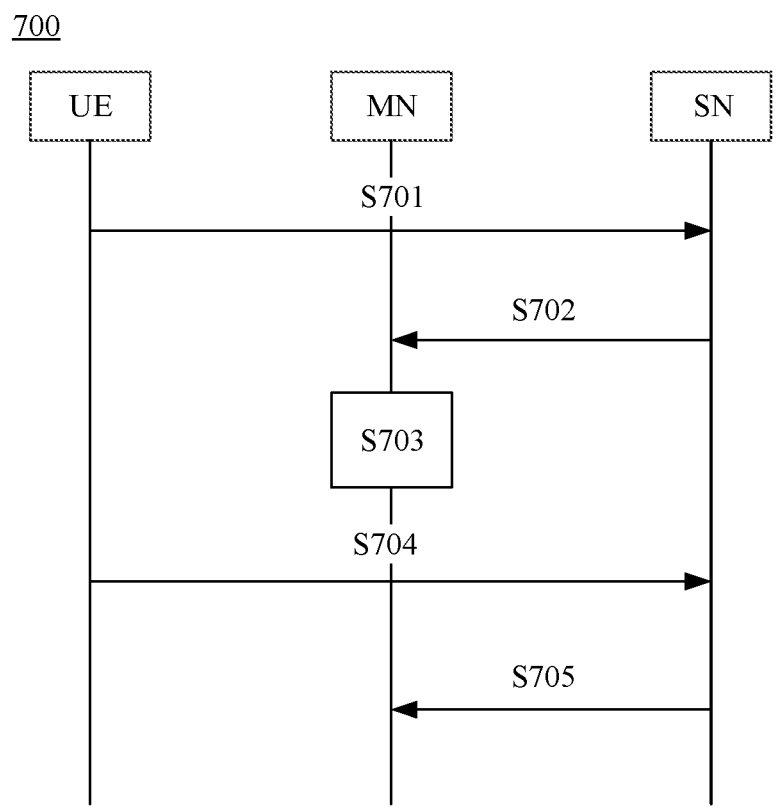
FIG. 7 is still another schematic flowchart of a method for notifying SCG status information according to an embodiment of this application.

FIG. 7 is still another schematic flowchart of a method for notifying SCG status information according to an embodiment of this application. The method 700 may be performed by UE, a master node, and a secondary node. In other words, the method may be performed by software or hardware installed on the UE, the master node, and the secondary node. As shown in FIG. 7, the method may include the following steps.

S701. The UE transmits SCG suspend request information (SCG Suspend Request) to a secondary node (SN).

S702. The secondary node transmits a secondary node activity notification message to a master node. The secondary node activity notification message includes SCG suspended status information.

A manner in which the secondary node transmits the secondary node activity notification to the master node includes but is not limited to the following.

(1) The secondary node transmits the activity notification message carrying the SCG suspended status once. The master node stores the SCG suspended status information. In this manner, signaling overheads can be reduced.

(2) The secondary node reports a plurality of activity notification messages carrying the SCG suspended status. The master node optionally stores the SCG suspended status information. In this manner, the master node and the secondary node can synchronize the SCG status multiple times.

S703. The master node determines whether to retain a resource corresponding to the secondary node during the suspension of the SCG. In a specific application, the master node can notify the secondary node of the decision.

S704. The UE transmits SCG resume request information (SCG Resume Request) to the secondary node.

S705. The secondary node transmits a secondary node activity notification message to the master node. The secondary node activity notification message includes but is not limited to the following information.

(1) SCG resumed status information.
(2) Other normal status such as inactive and re-activated.

Figure 8:
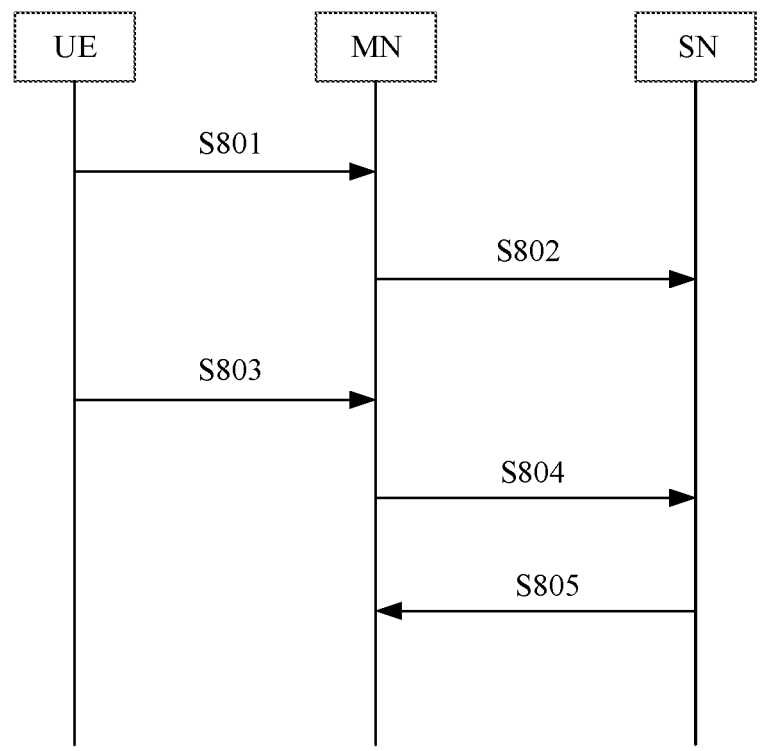
FIG. 8 is still another schematic flowchart of a method for notifying SCG status information according to an embodiment of this application.

FIG. 8 is still another schematic flowchart of a method for notifying SCG status information according to an embodiment of this application. The method 800 may be performed by UE, a master node, and a secondary node. In other words, the method may be performed by software or hardware installed on the UE, the master node, and the secondary node. As shown in FIG. 8, the method may include the following steps.

S801. UE transmits SCG suspend request information (SCG Suspend Request) to a master node.

S802. The master node transmits a first request message to a secondary node. The first request message includes SCG suspended status information.

After S802, the secondary node and the master node suspend reporting of all or some of activity notifications, for example, suspend reporting of user data inactivity.

S803. The UE transmits SCG resume request information (SCG Resume Request) to the master node.

S804. The master node transmits a second request message to the secondary node. The second request message includes SCG resumed status information.

S805. The secondary node resumes normal reporting of the activity notification such as inactive and re-activated.

It should be noted that the method for notifying secondary cell group status information provided in the embodiments of this application may be performed by an apparatus for notifying secondary cell group status information or a control module for performing the method for notifying secondary cell group status information in the apparatus for notifying secondary cell group status information. In the embodiments of this application, the method for notifying secondary cell group status information being performed by the apparatus for notifying secondary cell group status information is used as an example to describe the apparatus for notifying secondary cell group status information provided in the embodiments of this application.

Figure 9:
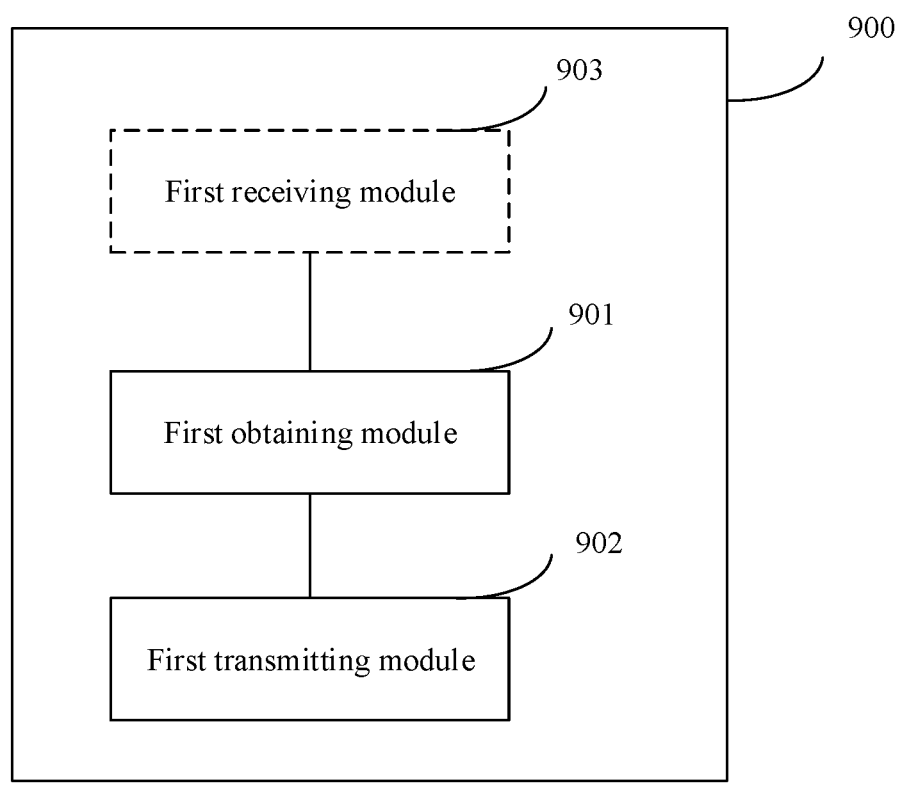
FIG. 9 is a schematic structural diagram of an apparatus for notifying SCG status information according to an embodiment of this application.

FIG. 9 is a schematic structural diagram of an apparatus for notifying secondary cell group status information according to an embodiment of this application. As shown in FIG. 9, the apparatus 900 may include a first obtaining module 901 and a first transmitting module 902.

In this embodiment of this application, the first obtaining module 901 is configured to obtain a secondary cell group SCG status; and the first transmitting module 902 is configured to transmit SCG status information to a master node based on the SCG status, where the SCG status information includes first status information or second status information, the first status information is used to indicate that the SCG is to be suspended, and the second status information is used to indicate that the SCG is to be resumed.

In a possible implementation, as shown in FIG. 9, the apparatus may further include a first receiving module 903 configured to, before the transmitting SCG status information to a master node based on the SCG status, receive SCG status request information from a terminal, where the SCG status request information is used to request to suspend the SCG, or the SCG status request information is used to request to resume the suspended SCG.

In a possible implementation, the first status information includes at least one of the following:
first indication information, where the first indication information indicates that the SCG is suspended by a terminal-initiated SCG suspend procedure, and the suspension of the SCG needs to be lifted by the terminal;
second indication information, where the second indication information indicates that the terminal suspends an MR-DC capability;
third indication information, where the third indication information indicates that the terminal disables an MR-DC capability;
fourth indication information, where the fourth indication information indicates that the terminal suspends an MR-DC terminal resource;
fifth indication information, where the fifth indication information indicates that the terminal disables an MR-DC terminal resource; and
sixth indication information, where the sixth indication information indicates that the SCG is suspended for a multi-SIM card.

In a possible implementation, the second status information includes at least one of the following:
seventh indication information, where the seventh indication information indicates that the SCG is resumed;
eighth indication information, where the eighth indication information indicates that a terminal-suspended SCG is resumed;
ninth indication information, where the ninth indication information indicates that the terminal resumes an MR-DC capability;
tenth indication information, where the tenth indication information indicates that the terminal enables an MR-DC capability;
eleventh indication information, where the eleventh indication information indicates that the terminal resumes an MR-DC terminal resource;
twelfth indication information, where the twelfth indication information indicates that the terminal enables an MR-DC terminal resource; and
thirteenth indication information, where the thirteenth indication information indicates that the SCG is resumed for a multi-SIM card.

In a possible implementation, the transmitting, by the first transmitting module 902, SCG status information to a master node includes:
adding the SCG status information into the following message and transmitting the message to the master node: a secondary node activity notification message.

In a possible implementation, the adding, by the first transmitting module 902, the first status information into the secondary node activity notification message and transmitting the message to the master node includes:

transmitting the secondary node activity notification message to the master node, where the secondary node activity notification message carries the first status information, and the secondary node activity notification message is transmitted once; or transmitting a plurality of secondary node activity notification messages to the master node, where each of the secondary node activity notification messages transmitted carries the first status information.

In a possible implementation, the first transmitting module 902 is further configured to, after transmitting the first status information to the master node, stop transmission of a notification control indication message to the master node.

In a possible implementation, the first transmitting module 902 is further configured to, after transmitting the second status information to the master node, resume transmission of the notification control indication message to the master node.

The apparatus for notifying secondary cell group status information in this embodiment of this application may be an apparatus, or may be a component, an integrated circuit, or a chip in a network-side device. The apparatus may be a base station. For example, the base station may include but is not limited to the types of the network-side device 12 listed above, which is not specifically limited in this embodiment of this application.

The apparatus for notifying secondary cell group status information in this embodiment of this application may be an apparatus with an operating system. The operating system may be an Android operating system, an iOS operating system, or another possible operating system, which is not specifically limited in this embodiment of this application.

The apparatus for notifying secondary cell group status information provided in this embodiment of this application can implement the processes implemented by the secondary node in the method embodiment shown in FIG. 2, with the same technical effects achieved. To avoid repetition, details are not described herein again.

Figure 10:
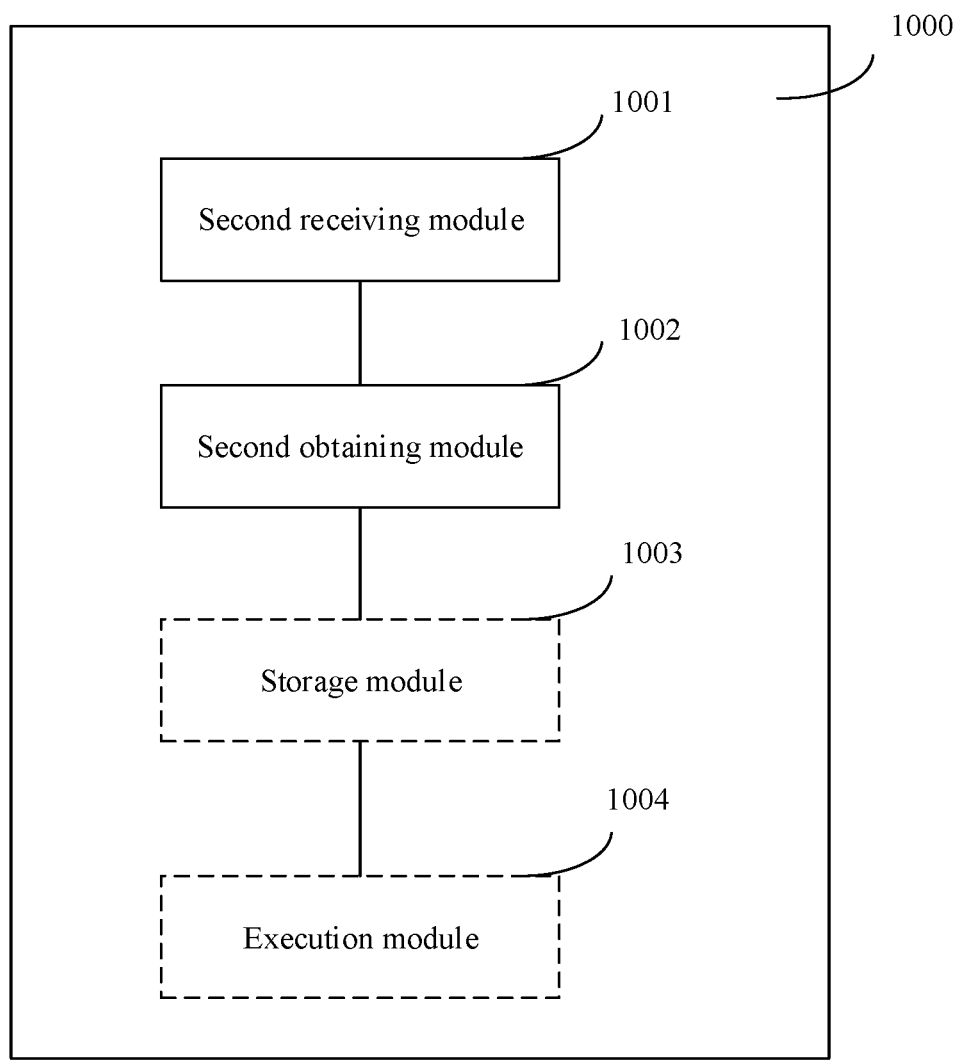
FIG. 10 is a schematic structural diagram of an apparatus for obtaining SCG status information according to an embodiment of this application.

FIG. 10 is a schematic structural diagram of an apparatus for obtaining secondary cell group status information according to an embodiment of this application. As shown in FIG. 10, the apparatus 1000 mainly includes a second receiving module 1001 and a second obtaining module 1002.

In this embodiment of this application, the second receiving module 1001 is configured to receive SCG status information transmitted by a secondary node, where the SCG status information includes first status information or second status information, the first status information is used to indicate that an SCG is to be suspended, and the second status information is used to indicate that the SCG is to be resumed; and the second obtaining module 1002 is configured to obtain an SCG status based on the SCG status information.

In a possible implementation, as shown in FIG. 10, the apparatus 1000 may further include a storage module 1003 configured to store the SCG status information; and/or an execution module 1004 configured to perform an SCG-related operation on a terminal based on the SCG status information.

In a possible implementation, the first status information includes at least one of the following:

first indication information, where the first indication information indicates that the SCG is suspended by a terminal-initiated SCG suspend procedure, and the suspension of the SCG needs to be lifted by the terminal;

second indication information, where the second indication information indicates that the terminal suspends an MR-DC capability;

third indication information, where the third indication information indicates that the terminal disables an MR-DC capability;

fourth indication information, where the fourth indication information indicates that the terminal suspends an MR-DC terminal resource;

fifth indication information, where the fifth indication information indicates that the terminal disables an MR-DC terminal resource; and sixth indication information, where the sixth indication information indicates that the SCG is suspended for a multi-SIM card.

In a possible implementation, the second status information includes at least one of the following:

seventh indication information, where the seventh indication information indicates that the SCG is resumed;

eighth indication information, where the eighth indication information indicates that a terminal-suspended SCG is resumed;

ninth indication information, where the ninth indication information indicates that the terminal resumes an MR-DC capability;

tenth indication information, where the tenth indication information indicates that the terminal enables an MR-DC capability;

eleventh indication information, where the eleventh indication information indicates that the terminal resumes an MR-DC terminal resource;

twelfth indication information, where the twelfth indication information indicates that the terminal enables an MR-DC terminal resource; and thirteenth indication information, where the thirteenth indication information indicates that the SCG is resumed for a multi-SIM card.

In a possible implementation, the receiving, by the second receiving module 1001, SCG status information transmitted by a secondary node includes: receiving the following message that carries the SCG status information: a secondary node activity notification message.

In a possible implementation, the performing, by the execution module 1004, an SCG-related operation on a terminal based on the SCG status information includes:

in a case that the SCG status information includes the first status information, performing at least one of the following operations:

prohibiting transmission of data in the SCG;

stopping transmission of a notification control indication message to the secondary node;

determining whether to retain a resource corresponding to the secondary node;

notifying the secondary node to modify or release a connection of the SCG; and reconfiguring the terminal to modify or release a connection of the SCG.

In a possible implementation, the performing, by the execution module 1004, an SCG-related operation on a terminal based on the SCG status information includes:

in a case that the SCG status information includes the second status information, performing at least one of the following operations:

resuming transmission of data in the SCG;

resuming transmission of a notification control indication message to the secondary node;

configuring a resource corresponding to the secondary node;

requesting the secondary node to add or modify a connection of the SCG; and reconfiguring the terminal to establish or modify a connection of the SCG.

The apparatus for obtaining secondary cell group status information in this embodiment of this application may be an apparatus, or may be a component, an integrated circuit, or a chip in a network-side device. The apparatus may be a base station. For example, the base station may include but is not limited to the types of the network-side device 12 listed above, which is not specifically limited in this embodiment of this application.

The apparatus for obtaining secondary cell group status information in this embodiment of this application may be an apparatus with an operating system. The operating system may be an Android operating system, an iOS operating system, or another possible operating system, which is not specifically limited in this embodiment of this application.

The apparatus for obtaining secondary cell group status information provided in this embodiment of this application can implement the processes implemented by the master node in the method embodiment shown in FIG. 4, with the same technical effects achieved. To avoid repetition, details are not described herein again.

Figure 11:
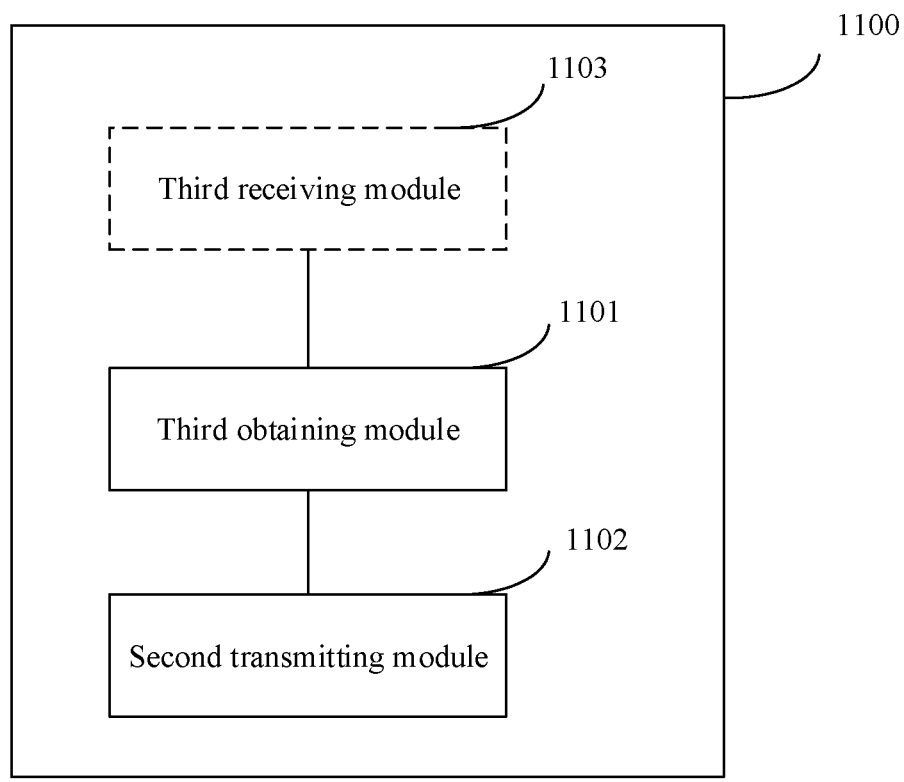
FIG. 11 is another schematic structural diagram of an apparatus for notifying SCG status information according to an embodiment of this application.

FIG. 11 is another schematic structural diagram of an apparatus for notifying secondary cell group status information according to an embodiment of this application. As shown in FIG. 11, the apparatus 1100 mainly includes a third obtaining module 1101 and a second transmitting module 1102.

In this embodiment of this application, the third obtaining module 1101 is configured to obtain an SCG status; and the second transmitting module 1102 is configured to transmit SCG status information to a secondary node based on the SCG status, where the SCG status information includes first status information or second status information, the first status information is used to indicate that the SCG is to be suspended, and the second status information is used to indicate that the SCG is to be resumed.

In a possible implementation, as shown in FIG. 11, the apparatus 1100 further includes a third receiving module 1103 configured to, before the transmitting SCG status information to a secondary node based on the SCG status, receive SCG status request information from a terminal, where the SCG status request information is used to request to suspend the SCG, or the SCG status request information is used to request to resume the suspended SCG.

In a possible implementation, the first status information includes at least one of the following:

first indication information, where the first indication information indicates that the SCG is suspended by a terminal-initiated SCG suspend procedure, and the suspension of the SCG needs to be lifted by the terminal;

second indication information, where the second indication information indicates that the terminal suspends an MR-DC capability;

third indication information, where the third indication information indicates that the terminal disables an MR-DC capability;

fourth indication information, where the fourth indication information indicates that the terminal suspends an MR-DC terminal resource;

fifth indication information, where the fifth indication information indicates that the terminal disables an MR-DC terminal resource; and sixth indication information, where the sixth indication information indicates that the SCG is suspended for a multi-SIM card.

In a possible implementation, the second status information includes at least one of the following:

seventh indication information, where the seventh indication information indicates that the SCG is resumed;

eighth indication information, where the eighth indication information indicates that a terminal-suspended SCG is resumed;

ninth indication information, where the ninth indication information indicates that the terminal resumes an MR-DC capability;

tenth indication information, where the tenth indication information indicates that the terminal enables an MR-DC capability;

eleventh indication information, where the eleventh indication information indicates that the terminal resumes an MR-DC terminal resource;

twelfth indication information, where the twelfth indication information indicates that the terminal enables an MR-DC terminal resource; and thirteenth indication information, where the thirteenth indication information indicates that the SCG is resumed for a multi-SIM card.

In a possible implementation, the first status information is further used to indicate that the secondary node suspends reporting of some or all of secondary node activity notification messages.

In a possible implementation, the second status information is further used to indicate that the secondary node resumes reporting of a secondary node activity notification message.

In a possible implementation, the second transmitting module 1102 is further configured to, after transmitting the first status information to the secondary node, stop transmission of a notification control indication message to the secondary node.

In a possible implementation, the second transmitting module 1102 is further configured to, after transmitting the second status information to the secondary node, resume transmission of the notification control indication message to the secondary node.

The apparatus for notifying secondary cell group status information in this embodiment of this application may be an apparatus, or may be a component, an integrated circuit, or a chip in a network-side device. The apparatus may be a base station. For example, the base station may include but is not limited to the types of the network-side device 12 listed above, which is not specifically limited in this embodiment of this application.

The apparatus for notifying secondary cell group status information in this embodiment of this application may be an apparatus with an operating system. The operating system may be an Android operating system, an iOS operating system, or another possible operating system, which is not specifically limited in this embodiment of this application.

The apparatus for notifying secondary cell group status information provided in this embodiment of this application can implement the processes implemented by the secondary node in the method embodiment shown in FIG. 5, with the same technical effects achieved. To avoid repetition, details are not described herein again.

Figure 12:
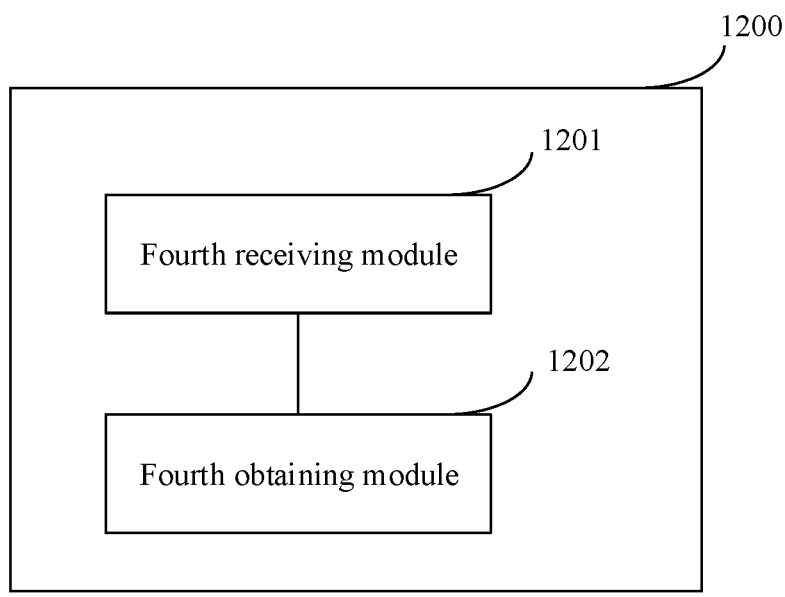
FIG. 12 is another schematic structural diagram of an apparatus for obtaining SCG status information according to an embodiment of this application.

FIG. 12 is a schematic structural diagram of an apparatus for obtaining secondary cell group status information according to an embodiment of this application. As shown in FIG. 12, the apparatus 1200 mainly includes a fourth receiving module 1201 and a fourth obtaining module 1202.

In this embodiment of this application, the fourth receiving module 1201 is configured to receive SCG status information transmitted by a master node, where the SCG status information includes first status information or second status information, the first status information is used to indicate that an SCG is to be suspended, and the second status information is used to indicate that the SCG is to be resumed; and the fourth obtaining module 1202 is configured to obtain an SCG status based on the SCG status information.

In a possible implementation, as shown in FIG. 12, the apparatus may further include a third transmitting module 1203 configured to:
- based on the SCG status information, suspend or resume transmission of a notification control indication message to the master node; and/or
- based on the SCG status information, suspend reporting of some or all of secondary node activity notification messages or resume reporting of a secondary node activity notification message.

The apparatus for obtaining secondary cell group status information in this embodiment of this application may be an apparatus, or may be a component, an integrated circuit, or a chip in a network-side device. The apparatus may be a base station. For example, the base station may include but is not limited to the types of the network-side device 12 listed above, which is not specifically limited in this embodiment of this application.

The apparatus for obtaining secondary cell group status information in this embodiment of this application may be an apparatus with an operating system. The operating system may be an Android operating system, an iOS operating system, or another possible operating system, which is not specifically limited in this embodiment of this application.

The apparatus for obtaining secondary cell group status information provided in this embodiment of this application can implement the processes implemented by the master node in the method embodiment shown in FIG. 6, with the same technical effects achieved. To avoid repetition, details are not described herein again.

Figure 13:
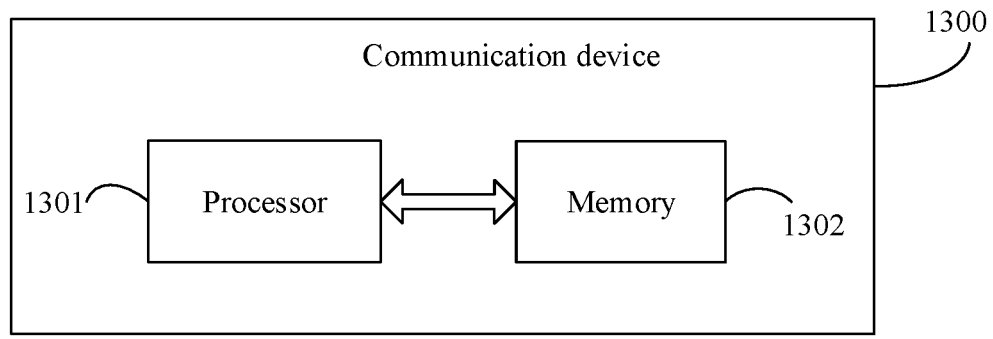
FIG. 13 is a schematic structural diagram of a communication device according to an embodiment of this application.

Optionally, as shown in FIG. 13, an embodiment of this application further provides a communication device 1300, including a processor 1301, a memory 1302, and a program or instructions stored in the memory 1302 and capable of running on the processor 1301. For example, in a case that the communication device 1300 is a network-side device, when the program or instructions are executed by the processor 1301, the processes of the foregoing embodiments of the method for notifying secondary cell group status information are implemented, with the same technical effects achieved. Alternatively, when the program or instructions are executed by the processor 1301, the processes of the foregoing embodiments of the method for obtaining secondary cell group status information are implemented, with the same technical effects achieved. To avoid repetition, details are not described herein again.

Figure 14:
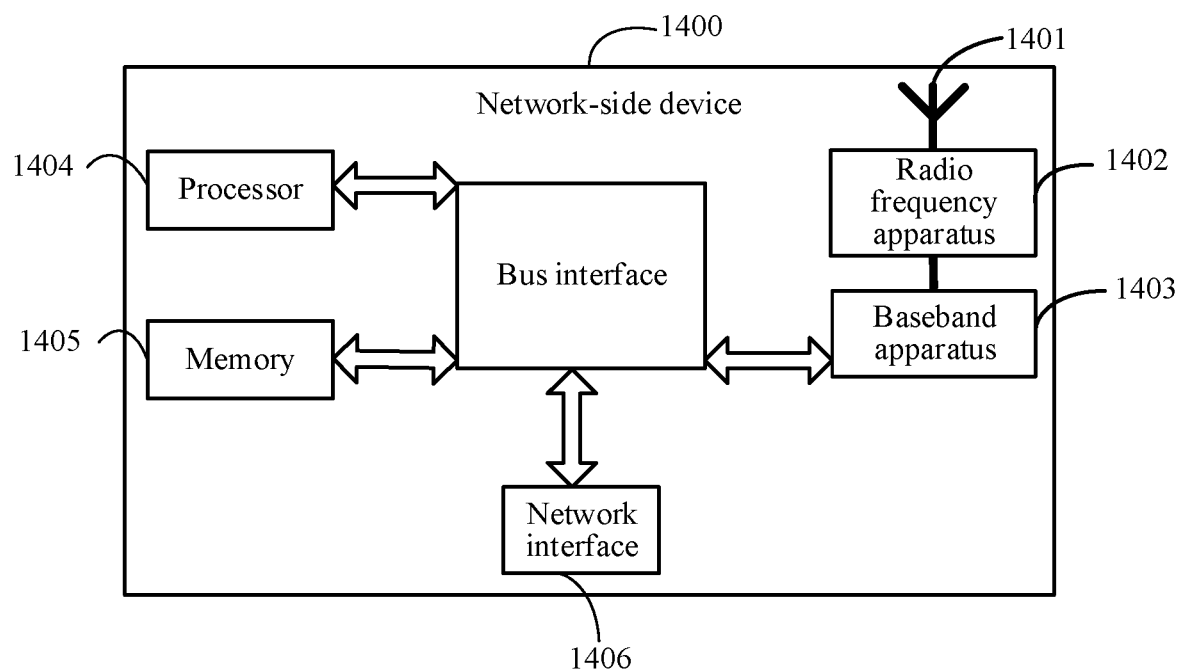
FIG. 14 is a schematic diagram of a hardware structure of a network-side device according to an embodiment of this application.

Specifically, an embodiment of this application further provides a network-side device. As shown in FIG. 14, the network-side device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and transmits the received information to the baseband apparatus 1403 for processing. In a downlink direction, the baseband apparatus 1403 processes information to be sent, and transmits the information to the radio frequency apparatus 1402; and the radio frequency apparatus 1402 processes the received information and then transmits the information by using the antenna 1401.

The aforementioned baseband processor may be located in the baseband apparatus 1403. The method performed by the network-side device in the foregoing embodiment may be implemented in the baseband apparatus 1403, and the baseband apparatus 1403 includes a processor 1404 and a memory 1405.

The baseband apparatus 1403 may include, for example, at least one baseband processing unit, where a plurality of chips are disposed on the baseband processing unit. As shown in FIG. 14, one of the chips is, for example, the processor 1404 which is connected to the memory 1405 to invoke a program in the memory 1405 to perform the operations of the network device shown in the foregoing method embodiment.

The baseband apparatus 1403 may further include a network interface 1406 configured to exchange information with the radio frequency apparatus 1402, where the interface is, for example, a common public radio interface (CPRI).

Specifically, the network-side device in this embodiment of this application further includes instructions or a program stored in the memory 1405 and capable of running on the processor 1404. The processor 1404 invokes the instructions or program in the memory 1405 to perform the method performed by the modules shown in FIG. 10 to FIG. 12, with the same technical effects achieved. To avoid repetition, details are not described herein again.

An embodiment of this application further provides a readable storage medium, where the readable storage medium stores a program or instructions, and when the program or instructions are executed by a processor, the processes of the foregoing embodiments of the method for notifying secondary cell group status information or the processes of the foregoing embodiments of the method for obtaining secondary cell group status information are implemented, with the same technical effects achieved. To avoid repetition, details are not described herein again.

The processor is a processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor, and the processor is configured to run a program or instructions of a network-side device to implement the processes of the foregoing embodiments of the method for notifying secondary cell group status information or the processes of the foregoing embodiments of the method for obtaining secondary cell group status information, with the same technical effects achieved. To avoid repetition, details are not described herein again.

An embodiment of this application further provides a computer program product, where the computer program product includes a processor, a memory, and a program or instructions stored in the memory and capable of running on the processor, and when the program or instructions are executed by the processor, the processes of the foregoing embodiments of the method for notifying secondary cell group status information or the processes of the foregoing embodiments of the method for obtaining secondary cell group status information are implemented, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and the apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A method for notifying secondary cell group status information, applied to a secondary node, wherein the method comprises:
    transmitting secondary cell group (SCG) status information to a master node based on an SCG status, wherein the SCG status information comprises first status information or second status information, the first status information is used to indicate that the SCG is to be suspended, and the second status information is used to indicate that the SCG is to be resumed,
    wherein the first status information comprises at least one of the following:
        first indication information, wherein the first indication information indicates that the SCG is suspended by a terminal-initiated SCG suspend procedure, and the suspension of the SCG needs to be lifted by a terminal;
        second indication information, wherein the second indication information indicates that the terminal suspends a multiple radio access technology dual connectivity (MR-DC) capability;
        third indication information, wherein the third indication information indicates that the terminal disables an MR-DC capability;
        fourth indication information, wherein the fourth indication information indicates that the terminal suspends an MR-DC terminal resource;
        fifth indication information, wherein the fifth indication information indicates that the terminal disables an MR-DC terminal resource; or
        sixth indication information, wherein the sixth indication information indicates that the SCG is suspended for a multi-SIM card; or
    wherein the second status information comprises at least one of the following:
        seventh indication information, wherein the seventh indication information indicates that the SCG is resumed;
        eighth indication information, wherein the eighth indication information indicates that a terminal-suspended SCG is resumed;
        ninth indication information, wherein the ninth indication information indicates that the terminal resumes an MR-DC capability;
        tenth indication information, wherein the tenth indication information indicates that the terminal enables an MR-DC capability;
        eleventh indication information, wherein the eleventh indication information indicates that the terminal resumes an MR-DC terminal resource;
        twelfth indication information, wherein the twelfth indication information indicates that the terminal enables an MR-DC terminal resource; or
        thirteenth indication information, wherein the thirteenth indication information indicates that the SCG is resumed for a multi-SIM card.

2. The method according to claim 1, wherein before the transmitting SCG status information to a master node based on an SCG status, the method further comprises:
    receiving SCG status request information from the terminal, wherein the SCG status request information is used to request to suspend the SCG, or the SCG status request information is used to request to resume the suspended SCG.

3. The method according to claim 1, wherein the transmitting SCG status information to a master node comprises:
    adding the SCG status information into a secondary node activity notification message and transmitting the secondary node activity notification message to the master node.

4. The method according to claim 3, wherein adding the first status information into the secondary node activity notification message and transmitting the message to the master node comprises:

transmitting the secondary node activity notification message to the master node, wherein the secondary node activity notification message carries the first status information, and the secondary node activity notification message is transmitted once; or transmitting a plurality of secondary node activity notification messages to the master node, wherein each of the secondary node activity notification messages transmitted carries the first status information.

5. The method according to claim 1, wherein after the first status information is transmitted to the master node, the method further comprises: stopping transmission of a notification control indication message to the master node.

6. The method according to claim 5, wherein after the second status information is transmitted to the master node, the method further comprises: resuming transmission of the notification control indication message to the master node.

7. A method for obtaining secondary cell group status information, applied to a master node, wherein the method comprises:
receiving SCG status information transmitted by a secondary node, wherein the SCG status information comprises first status information or second status information, the first status information is used to indicate that an SCG is to be suspended, and the second status information is used to indicate that the SCG is to be resumed,
wherein the first status information comprises at least one of the following:
first indication information, wherein the first indication information indicates that the SCG is suspended by a terminal-initiated SCG suspend procedure, and the suspension of the SCG needs to be lifted by a terminal;
second indication information, wherein the second indication information indicates that the terminal suspends an MR-DC capability;
third indication information, wherein the third indication information indicates that the terminal disables an MR-DC capability;
fourth indication information, wherein the fourth indication information indicates that the terminal suspends an MR-DC terminal resource;
fifth indication information, wherein the fifth indication information indicates that the terminal disables an MR-DC terminal resource; or
sixth indication information, wherein the sixth indication information indicates that the SCG is suspended for a multi-SIM card,
or
wherein the second status information comprises at least one of the following:
seventh indication information, wherein the seventh indication information indicates that the SCG is resumed;
eighth indication information, wherein the eighth indication information indicates that a terminal-suspended SCG is resumed;
ninth indication information, wherein the ninth indication information indicates that the terminal resumes an MR-DC capability;
tenth indication information, wherein the tenth indication information indicates that the terminal enables an MR-DC capability;
eleventh indication information, wherein the eleventh indication information indicates that the terminal resumes an MR-DC terminal resource;
twelfth indication information, wherein the twelfth indication information indicates that the terminal enables an MR-DC terminal resource; or
thirteenth indication information, wherein the thirteenth indication information indicates that the SCG is resumed for a multi-SIM card.

8. The method according to claim 7, wherein after the receiving SCG status information transmitted by a secondary node, the method further comprises at least one of: storing the SCG status information; or performing an SCG-related operation on a terminal based on the SCG status information.

9. The method according to claim 8, wherein the performing an SCG-related operation on a terminal based on the SCG status information comprises: in a case that the SCG status information comprises the first status information, performing at least one of the following operations:
prohibiting transmission of data in the SCG;
stopping transmission of a notification control indication message to the secondary node;
determining whether to retain a resource corresponding to the secondary node;
notifying the secondary node to modify or release a connection of the SCG; or
reconfiguring the terminal to modify or release a connection of the SCG.

10. The method according to claim 8, wherein the performing an SCG-related operation on a terminal based on the SCG status information comprises: in a case that the SCG status information comprises the second status information, performing at least one of the following operations:
resuming transmission of data in the SCG;
resuming transmission of a notification control indication message to the secondary node;
configuring a resource corresponding to the secondary node;
requesting the secondary node to add or modify a connection of the SCG; or
reconfiguring the terminal to establish or modify a connection of the SCG.

11. The method according to claim 7, wherein the receiving SCG status information transmitted by a secondary node comprises: receiving a secondary node activity notification message that carries the SCG status information.

12. A network-side device, comprising:
at least one hardware processor, a memory, and a program or instructions stored in the memory and capable of running on the at least one hardware processor, wherein the program or instructions, when being executed by the processor, cause the network-side device to implement operations comprising:
transmitting SCG status information to a master node based on an SCG status, wherein the SCG status information comprises first status information or second status information, the first status information is used to indicate that the SCG is to be suspended, and the second status information is used to indicate that the SCG is to be resumed,
wherein the first status information comprises at least one of the following:
first indication information, wherein the first indication information indicates that the SCG is suspended by a terminal-initiated SCG suspend procedure, and the suspension of the SCG needs to be lifted by a terminal;

second indication information, wherein the second indication information indicates that the terminal suspends an MR-DC capability;

third indication information, wherein the third indication information indicates that the terminal disables an MR-DC capability;

fourth indication information, wherein the fourth indication information indicates that the terminal suspends an MR-DC terminal resource;

fifth indication information, wherein the fifth indication information indicates that the terminal disables an MR-DC terminal resource; or sixth indication information, wherein the sixth indication information indicates that the SCG is suspended for a multi-SIM card, or wherein the second status information comprises at least one of the following:

seventh indication information, wherein the seventh indication information indicates that the SCG is resumed;

eighth indication information, wherein the eighth indication information indicates that a terminal-suspended SCG is resumed;

ninth indication information, wherein the ninth indication information indicates that the terminal resumes an MR-DC capability;

tenth indication information, wherein the tenth indication information indicates that the terminal enables an MR-DC capability;

eleventh indication information, wherein the eleventh indication information indicates that the terminal resumes an MR-DC terminal resource;

twelfth indication information, wherein the twelfth indication information indicates that the terminal enables an MR-DC terminal resource; or thirteenth indication information, wherein the thirteenth indication information indicates that the SCG is resumed for a multi-SIM card.

13. The network-side device according to claim 12, wherein before the transmitting SCG status information to a master node based on an SCG status, the operations further comprise: receiving SCG status request information from the terminal, wherein the SCG status request information is used to request to suspend the SCG, or the SCG status request information is used to request to resume the suspended SCG.

14. The network-side device according to claim 12, wherein the transmitting SCG status information to a master node comprises: adding the SCG status information into a secondary node activity notification message and transmitting the secondary node activity notification message to the master node.

\* \* \* \* \*